(No Model.)

J. W. COLLINS.
ANIMAL TRAP.

No. 524,415.  Patented Aug. 14, 1894.

WITNESSES:
Chas. Marvin.
M. M. Borst.

INVENTOR
Jerrey W. Collins,
BY
Smith & Denison
ATTORNEYS.

UNITED STATES PATENT OFFICE.

JERREY W. COLLINS, OF KENWOOD, NEW YORK, ASSIGNOR TO THE ONEIDA COMMUNITY, LIMITED, OF SAME PLACE.

ANIMAL-TRAP.

SPECIFICATION forming part of Letters Patent No. 524,415, dated August 14, 1894.

Application filed January 13, 1894. Serial No. 496,713. (No model.)

*To all whom it may concern:*

Be it known that I, JERREY W. COLLINS, of Kenwood, in the county of Oneida, in the State of New York, have invented new and useful Improvements in Traps, of which the following, taken in connection with the accompanying drawings, is a full, clear, and exact description.

My invention relates to traps, and to that particular class in which the jaws are held open by means of a lever engaging with both jaws to hold them open, by its detachable engagement with the pan, and in which the jaws, when released, are closed by means of a spring having an eye fitting around the jaws at one end thereof.

My object is to produce an improved trap for catching animals, in which both of the jaws, when opened, are held open by means of a lever, pivoted upon one end of the trap body, and widened laterally so as to engage with both jaws, its inner end engaging with the pan, so that when said pan is depressed, the lever is released, and the jaws are closed by the action of the closing spring engaging with the jaws at the opposite end; in which the body or base of the trap is concaved so as to greatly increase its strength, and also so that only its edges rest upon the ground, and thus when the trap is set upon soft or muddy ground, as is very frequently the case, the hinge by which the pan is mounted upon said body will not freeze fast.

My invention consists in the several novel features of construction and operation hereinafter described and which are specifically set forth in the claims hereunto annexed. It is constructed as follows, reference being had to the accompanying drawings, in which—

Figure 1:
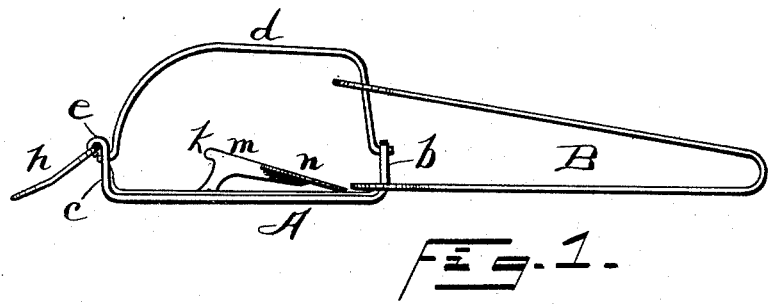
Figure 2:
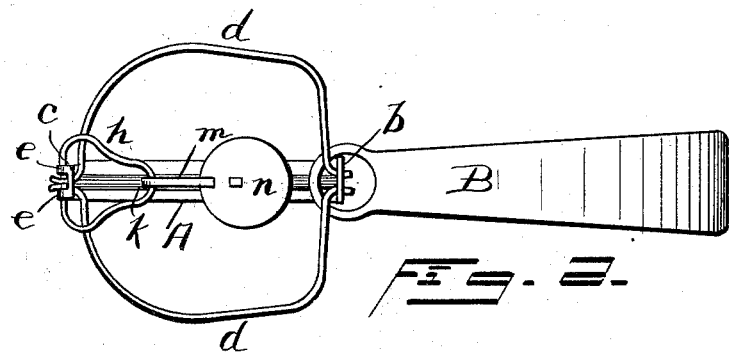
Figure 3:
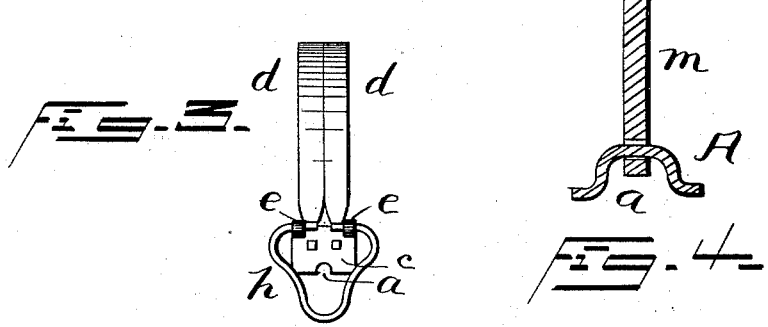
Figure 4:
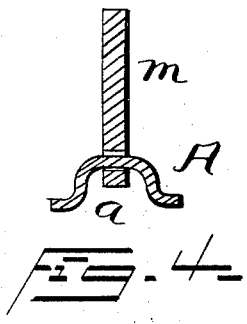

Figure 1, is a side elevation of the trap, closed. Fig. 2, is a top plan of same, opened and set. Fig. 3, is a front elevation of same, closed. Fig. 4, is a sectional detail of the body or base, and of the connection of the shank of the pan to it.

A— is the body, concaved longitudinally as at —*a*— and having its ends upturned to form the standards —*b*— —*c*—, both being perforated to form the bearings for the jaws —*d*—.

Upon the outer face of the standard —*c*— the bearings —*e*— are created, by any means, and in them the jaw locking lever —*h*— is pivoted, said lever being wide enough to engage with both jaws, to hold them open when its point is in engagement with the lip —*k*— upon the shank —*m*—, said shank carrying the pan —*n*— and being pivotally mounted in a slot-way cut in the body. By squeezing the sides of the lever together adjacent to the point, the lever is elongated, or by spreading them it is shortened, and the point itself can be bent up or down, all to vary the set of the pan as may be desired. This lever is shown as consisting of a single piece of wire, bent to the form shown.

It will be seen that the concavity of the base, and the resultant elevation of the pivot of the shank of the pan, will prevent the freezing up of said pivot so as to prevent the oscillation of the pan to release the jaws, when the trap is set upon moist or muddy ground.

B. is the ordinary U-shaped spring having eyes in its ends and fitting onto the standard —*b*— and adapted to close the jaws. It will be further seen that this concave base can be applied to any style of jaw trap. It will also be observed that it is unnecessary to concave the lower face of the base its entire length, but only that portion beneath the hinge of the pan.

What I claim as my invention, and desire to secure by Letters Patent, is—

1. In a trap a base concavo-convex in cross section as substantially set forth.

2. A jaw trap comprising a base, concavo-convex in cross section, jaws, and a pan mounted thereon.

3. A jaw trap comprising a base, grooved longitudinally, in which the pan is hinged and jaws mounted in said base.

4. In a jaw trap, the combination with a base grooved longitudinally having upturned standards at the end or ends, jaws having their bearing therein of a jaw locking lever pivoted upon one of said standards and adapted to engage with and hold both jaws open, and a pan shank provided with a lip with which said lever engages.

5. In a trap, the combination with the base and jaws, mounted thereon, of the pan shank and the pan thereon, of a triangular shaped lever constructed from a continuous piece of wire engaging with the pan shank, and adjustable to vary its engagement with said shank.

In witness whereof I have hereunto set my hand this 27th day of December, 1893.

JERREY W. COLLINS.

In presence of—
FERRAND F. ELLIS,
O. D. WRIGHT.